United States Patent [19]
Spies

[11] Patent Number: 5,619,132
[45] Date of Patent: Apr. 8, 1997

[54] POSITION MEASURING DEVICE EMPLOYING PRIMARY AND AUXILIARY MAGNETIC FIELDS

[75] Inventor: Alfons Spies, Seebruck, Germany

[73] Assignee: Johannes Heidenhain GmbH, Traunreut, Germany

[21] Appl. No.: 224,647

[22] Filed: Apr. 7, 1994

[30] Foreign Application Priority Data

Apr. 10, 1993 [EP] European Pat. Off. ............. 93105911

[51] Int. Cl.⁶ .................. G01B 7/14; H01L 43/02
[52] U.S. Cl. .................. 324/207.21; 338/32 R
[58] Field of Search .............. 324/207.21, 207.22, 324/207.23, 235, 252, 207.2, 251; 338/32 R, 32 H; 327/510, 511

[56] References Cited

U.S. PATENT DOCUMENTS

| | | | |
|---|---|---|---|
| 4,079,360 | 3/1978 | Ookubo et al. ............. | 324/252 X |
| 4,361,805 | 11/1982 | Narimatsu et al. . | |
| 4,401,944 | 8/1983 | Narimatsu et al. ............. | 324/252 X |
| 4,596,950 | 6/1986 | Lienhard et al. ............. | 324/252 X |
| 4,649,342 | 3/1987 | Nakamura . | |
| 4,725,776 | 2/1988 | Onodera et al. ............. | 324/252 X |
| 4,754,221 | 6/1988 | Ao et al. ............. | 324/252 X |
| 4,806,860 | 2/1989 | Iijima et al. ............. | 324/252 X |
| 5,021,736 | 6/1991 | Gonsalves et al. ............. | 324/252 X |
| 5,243,280 | 9/1993 | Kusumi ............. | 324/252 X |

FOREIGN PATENT DOCUMENTS

| | | |
|---|---|---|
| 0069392 | 1/1983 | European Pat. Off. . |
| 2452716 | 10/1980 | France . |
| 2834519A1 | 7/1980 | Germany . |
| 3422328 | 12/1984 | Germany . |
| 4306634 | 9/1993 | Germany . |
| 94/15223 | 7/1994 | WIPO .................. 324/252 |

OTHER PUBLICATIONS

Reuber, C., "Jüngere Ideen Für Magneto–Sensoren", *Messen Prüfer Automatisieren*, Jul./Aug. 1985, pp. 345–355.
Reiniger, Günter, "Drehwinkelmessung mit Magnetfeldsensoren," *Elektronik*, Nov. 14, 1986, pp. 129–136.
Nelson, T.J. et al., "Shear–Sensitive Magnetoresistive Robotic Tactile Sensor," *1986 Digests of Intermage '86 International Magnetics Conference Apr. 14–17*, one page.
Patent Abstracts of Japan, Publication No. JP 56122912, published Sep. 26, 1981, one page.

*Primary Examiner*—Sandra L. O'Shea
*Assistant Examiner*—Roger C. Phillips
*Attorney, Agent, or Firm*—Brinks Hofer Gilson & Lione

[57] ABSTRACT

A magnetic measuring system having a scale and a scanning unit, the scanning unit having a plurality of magneto-resistive elements which are disposed at an angle β with respect to the measuring direction. The scanning unit generates an auxiliary magnetic field which acts perpendicularly to the measuring direction so as to magnetically bias the magneto-resistive elements.

26 Claims, 12 Drawing Sheets

POSITION MEASURING DEVICE EMPLOYING PRIMARY AND AUXILIARY MAGNETIC FIELDS

FIELD OF THE INVENTION

The invention relates to a position measuring system for measuring the relative position of two objects which are movable with respect to each other, and more particularly to a position measuring system wherein a periodic graduation in the form of a magnetic record medium having a magnetization pattern recorded thereon is scanned in the measuring direction by a scanning unit having at least one magneto-resistive element for generating position-dependent output signals from which position measurement values can be determined in an evaluation device.

BACKGROUND OF THE INVENTION

German Patent Publication DE 28 34 519 A1 discloses a digital linear measuring device having two parts which are displaceable with respect to each other, one of which supports a scale and the other a detector for scanning the scale and for generating electrical signals which correspond to the scanned length of the scale. An electronic device processes the detector signals. The scale has a marking support with material which can be magnetized and is magnetized at predefined distances to form readable markings. The detector includes a reading head for reading the markings of the scale. A digital display device can be used for performing further processing. The marking support can be a magnetic layer with the markings formed by sinusoidal magnetization of two tracks and a reading head being respectively provided for each track. The detector can have at least one magnetic head sensitive to flux which is connected between the detector and the marking support in accordance with the principle of a magnetic modulator for reading at low relative speed. Detailed information regarding the embodiment of the detector is absent in the mentioned reference.

European Patent Publication EP 0 069 392 A2 discloses a digital position measuring device wherein a detector having a magneto-resistive sensor is provided. Magneto-resistive sensors with different characteristic curves are described therein and bridge circuits having such sensors are disclosed.

SUMMARY OF THE INVENTION

According to a first aspect of the invention there is provided a position measuring device having a scanning unit with a magneto-resistive sensor which is insensitive to changes in distance in relation to the scale, the scanning signal of which has the same frequency and which contains few harmonic portions.

The advantages of the position measuring device of the invention lie in its functional dependability, in the displacement of the operating point of the magneto-resistive elements into the linear range of their characteristic curve and the positive features resulting therefrom.

The invention itself, together with objects and attendant advantages, will best be understood by reference to the following detailed description taken in conjunction with accompanying drawings. It should be understood, however, that this description is to be illustrative rather than limiting, the scope of the invention being defined by the appended claims and equivalents thereof.

DETAILED DESCRIPTION OF THE PRESENTLY PREFERRED EMBODIMENTS

Figure 1A:
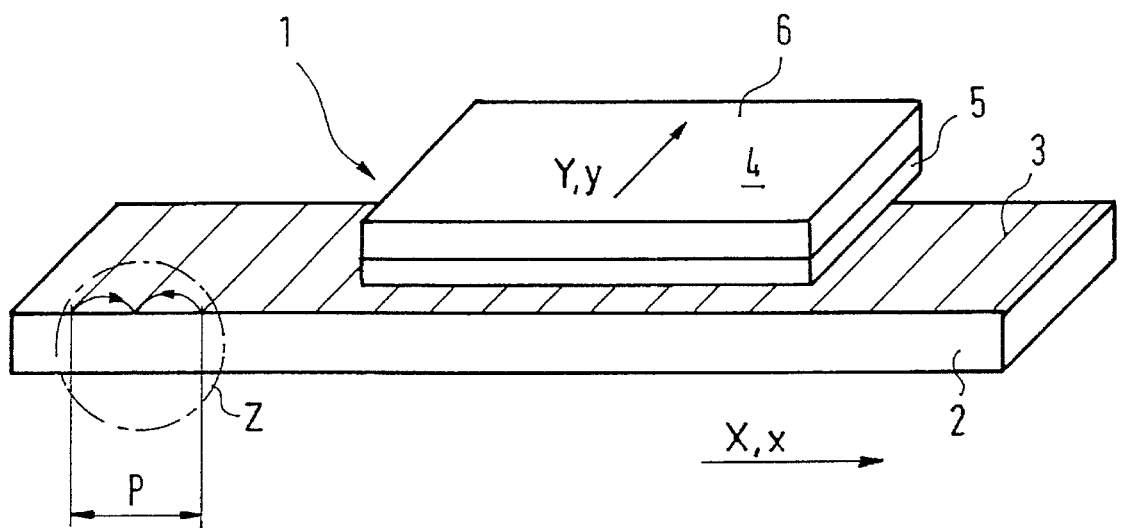
FIG. 1a is a perspective view of a position measuring device according to a preferred embodiment of the present invention.

FIG. 1a is a perspective view of a position measuring device 1 according to a preferred embodiment of the present invention. The magnetic linear measuring device 1 includes a scale 2 and a scanning unit 4. The scale 2 is preferably mounted on a first object such as a workpiece and the scanning unit 4 is mounted on a second object such as a machine tool, for example, the first and second objects being movable with respect to each other along the displacement direction x. While the position measuring device shown in FIG. 1 is directed to measuring linear displacements, the present invention can also be employed with angular position measuring devices.

In a preferred embodiment, the scale 2 is formed of a magnetic record medium and it has a magnetization pattern recorded preferably on its surface, in the direction of displacement x. The magnetic pattern recorded on the scale 2 forms a periodic graduation 3 having a series of magnetized strips alternately arranged with opposite field strength to create a graduation 3 with graduation period P. Magnetization preferably takes place along the plane in which the scale 2 extends but it can also extend vertically thereto.

The scanning unit 4 includes at least one magneto-resistive element 5 mounted on a scanning plate (not shown) for scanning the periodic graduation 3 of the scale 2 and a module 6 for generating an auxiliary magnetic field Y. The magneto-resistive elements will be described in detail hereinafter with reference to FIGS. 2a–15. With reference to those Figures, the number 5 will be used to identify the magneto-resistive element(s) followed by the respective drawing figure number as an index.

The module 6 of the scanning unit 4 generates an auxiliary magnetic field Y preferably perpendicular to the displacement direction x and parallel with the plane of scale 2. The auxiliary magnetic field Y can be generated either electromagnetically or through the use of permanent magnets.

Figure 1B:
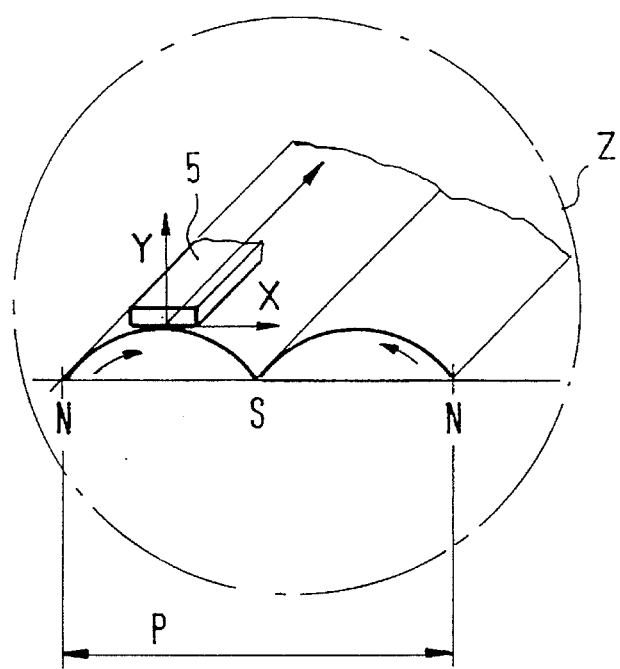
FIG. 1b is an exploded view of a section of the scale shown in FIG. 1a with a magneto-resistive element 5 positioned thereabove.

FIG. 1b is an exploded view of a section of the scale shown in FIG. 1a with a magneto-resistive element 5 positioned thereabove. The magnetization of scale 2 generates a stray field which is symbolically illustrated by the arrows pointing from the North field strips to the South field strip. The auxiliary field Y acts perpendicularly to a component of this stray field caused by the magnetization of scale 2 and in a plane parallel to the scale 2.

Figure 2A:
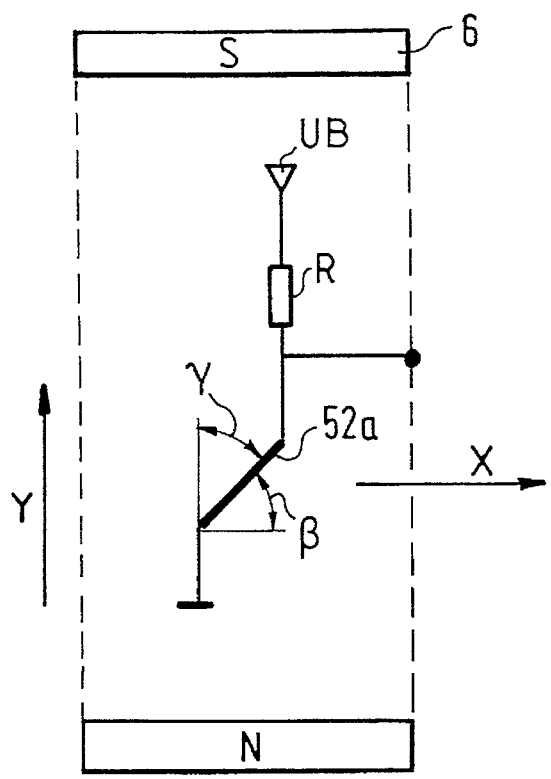
FIG. 2a is a schematic view of a magneto-resistive element in the scanning unit.

FIG. 2a illustrates an individual magneto-resistive element 52a for explaining the basic principles of operation of such elements.

A component of the stray field caused by the magnetization of the scale 2, hereinafter also called scale field X, acts in the direction of measurement or the displacement direction indicated by arrow x (see FIG. 1a). The auxiliary field Y generated by the module 6 acts perpendicularly thereto in a plane parallel with the scale 2. Thus, each magneto-resistive element 5 is subjected to the effects of both the scale field X and the auxiliary field Y. The magneto-resistive element 52a is disposed at an angle β with respect to the scale field X and an angle γ with respect to the auxiliary field Y. Both β and γ may range from 90° to 0°. In a preferred embodiment, β and γ are both 45°. In a preferred embodiment the magneto-resistive element 52a is complemented into a bridge unit, in this case a half-bridge, with the aid of a fixed resistor 7.

Figure 2B:
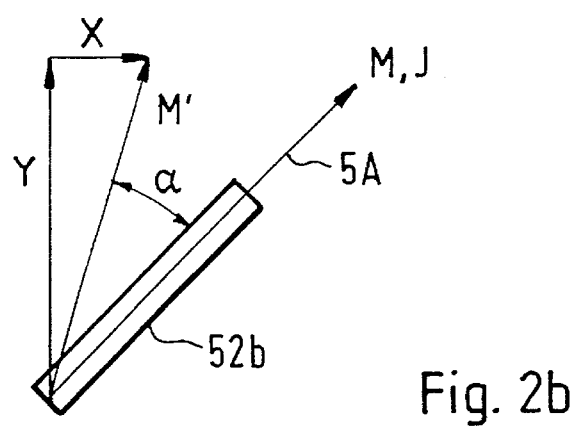
FIG. 2b is a vectorial illustration of the interrelationship between resistance variation, magnetization and direction of current flow.

Because of the oblique position of the magneto-resistive element 52a in the scanning unit 4, the magneto-resistive element 52a is magnetically biased under the effect of the auxiliary field Y which will be explained with reference to FIG. 2b. Without the auxiliary field Y and the scale field X and because of the strong anisotropism of the magnetically sensitive layer of the element 52b, the magnetization vector M is oriented in the direction of the so-called light axis which, as a result of the manufacturing process, is oriented in the direction of the element axis 5A. If a voltage U is applied to the element 52b, the current vector J also flows in the direction of the light axis. Now, by providing a sufficiently strong auxiliary field Y, the magnetization vector M' is no longer along the light axis but rather forms an angle α therewith towards the direction of the auxiliary field Y. An angle α is thus created between the magnetization vector M' and the current vector J. By vectorial addition of the auxiliary field Y and the scale field X, the angle α is now changed in small amounts in accordance with the changing scale field X. The resistance R of the magneto-resistive element 52b is a function of the angle α and can be defined by equation (1).

$$\Delta R = \rho \cos^2(\alpha + \delta\alpha), \text{ where} \tag{1}$$

ρ is the resulting resistance and δα is the change in angle α.

The resulting resistance results from the resistance parallel to the light axis and the resistance perpendicular thereto. It is dependent upon the actual angle between the current vector I and the magnetization vector M. Because the resistance R of the magneto-resistive element 52b is a function of the angle α formed between the current vector J and the magnetization vector M, a changing voltage results with the movement of the magneto-resistive element 52b over the scale 2.

For small changes in δα, equation (1) can be approximated by equation (2).

$$\Delta R = \rho(1 - (X/Y)) \tag{2}$$

The operating point on the characteristic curve of the magneto-resistive element 5 is displaced into a linear range by this approximation, and the scanning signal obtained by scanning the scale 2 has the same frequency as the graduation 3 or its graduation period P. In contrast thereto, in conventionally arranged magneto-resistive elements without an auxiliary magnetic field, the scanning signal has twice the frequency of the scale graduation and the characteristic curve is "square". In addition, the hysteresis is considerably less than that of a square characteristic curve.

Figure 3:
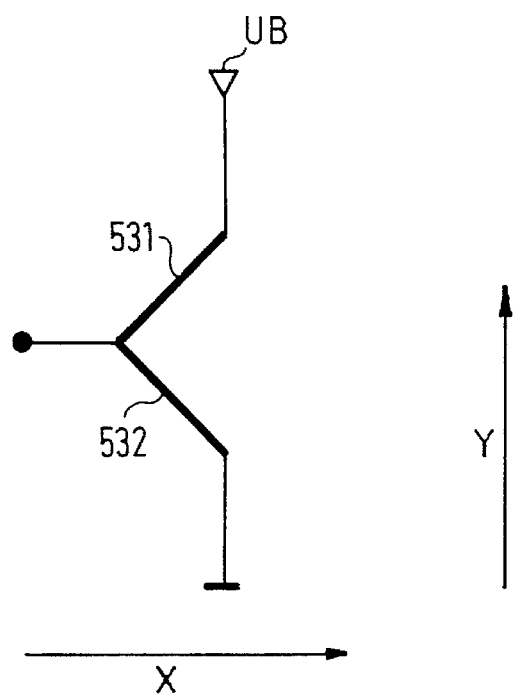
FIG. 3 illustrates two magneto-resistive elements geometrically position to eliminate zero drift.

FIG. 3 illustrates two magneto-resistive elements 531 and 532 combined in a so-called half-bridge configuration. Because of their mutual geometric position in the effective range of the scale and the auxiliary fields X and Y respectively, the zero drift of the individual magneto-resistive elements 531 and 532, hereinafter called sensor elements, is eliminated to a large extent since they essentially cancel each other out. This arrangement is particularly suited for scanning coded graduations.

Naturally, only a signal of weak strength is generated in the course of scanning the graduation 3 with an individual sensor element 5. For this reason, in actual use, the scanning unit 4 includes a plurality of sensor elements 5 arranged in various configurations and combined into bridge circuits, as will be described with reference to the subsequent Figures.

Figure 4:
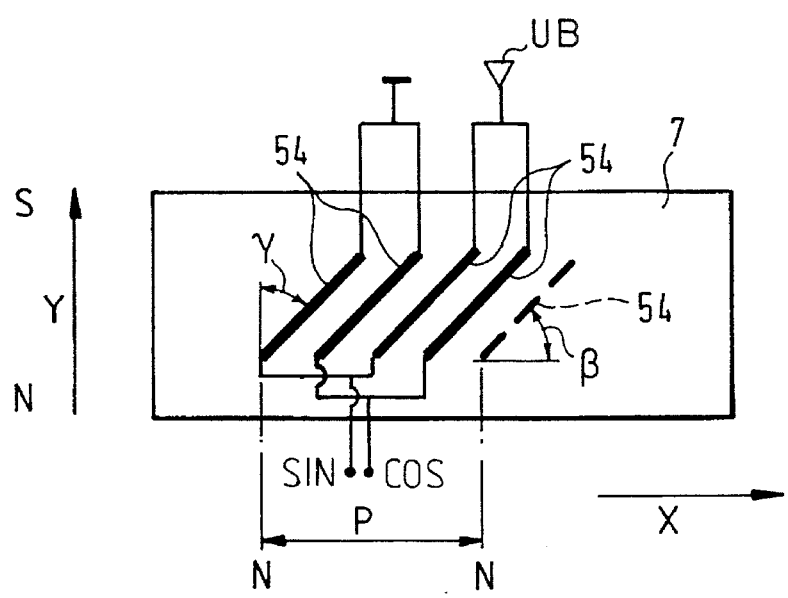
FIG. 4 illustrates a first preferred embodiment for the arrangement of magneto-resistive elements on a scanning plate.

FIG. 4 illustrates a first preferred embodiment for the arrangement of magneto-resistive elements 54 on a scanning plate 7. The scanning plate 7 forms part of the scanning unit 4 and is connected to the module 6 of the scanning unit 4. The zones of the elements 54 which are sensitive to a magnetic field are drawn in heavy lines. These zones are inclined at angles β and γ with respect to the scale field X (and therefore the measuring direction x) and the auxiliary field Y respectively. In a preferred embodiment β and γ are both 45°. A plurality of magneto-resistive elements 54 are disposed at distances of ¼ of the scale graduation period P (measured from N to N) from each other for obtaining two sinusoidal signals. The magneto-resistive elements 54 are linked into half- or full bridges in a manner known to those of ordinary skill in the art. With respect to the configuration shown in FIG. 4, two half-bridges are shown, which are operated with an operational voltage UB and which respectively output a SIN and COS signal.

The operating point of the sensor elements 54 on the characteristic curve is displaced into a linear range because of the oblique placement of the sensor elements 54 with respect to the auxiliary field Y. In contrast to conventional arrangements, the signal period corresponds to the graduation period P measured from N to N. In addition, because of the linearization of the characteristic curve, the output signals become more sinusoidal and the hysteresis becomes less.

A further advantage is the adjustability of the sensitivity of the sensor elements by adjusting the strength of the auxiliary field Y. This is particularly advantageous with scales having large graduation periods, since such scales generate strong scale fields which would drive ordinary sensor elements into saturation. In conventional systems, in order to protect the sensor elements from overload that would be caused by a scale having a large graduation period, the distance between the scale and the scanning unit had to be increased thereby eliminating the advantage of utilizing large graduation periods.

Another advantage of the linearization of the characteristic curve of the sensor elements according to the present invention is a reduced distance sensitivity of the signal amplitude since the effective scale graduation period employed by the sensor element is twice as large as the effective scale graduation period used in conventional systems in which the sensor element has a square characteristic curve.

The above described advantages are of course also applicable to the following preferred embodiments, in which special emphasis has been placed on the filtering of unwanted harmonics.

Figure 5:
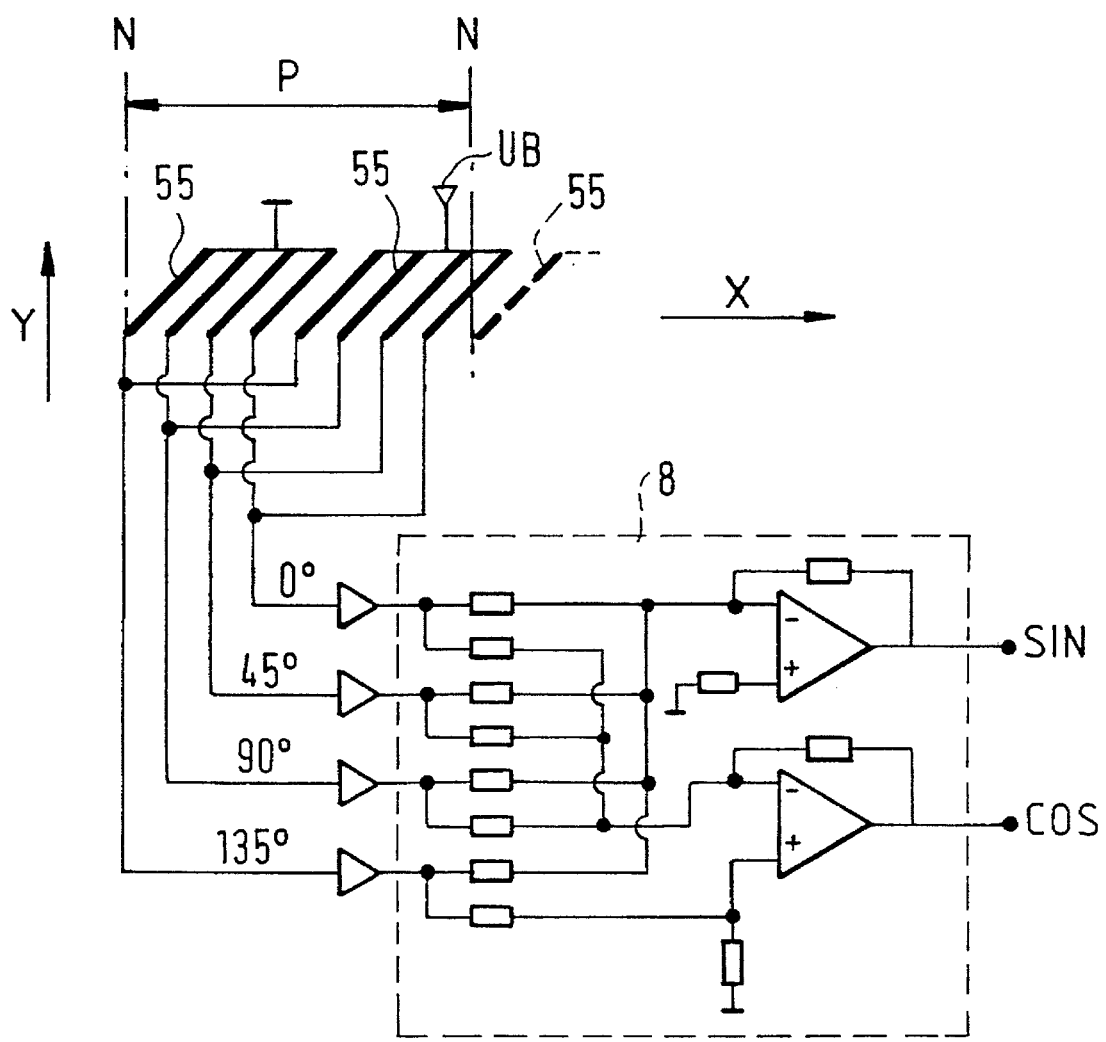
FIG. 5 illustrates a second preferred embodiment for the arrangement of sensor elements for suppressing harmonics.

FIG. 5 illustrates a second preferred embodiment for the arrangement of sensor elements for suppressing harmonics. Eight sensor elements 55 per graduation period P are disposed on a scanning plate (not shown) for suppressing harmonics. The signals of the individual half- and full bridges are individually amplified and applied to a network 8 from which a SIN and COS signal are output. The network 8 includes a group of resistors $R_1$–$R_{12}$ and two amplifiers $A_1$ and $A_2$. The resistances of the resistors $R_1$–$R_{12}$ are selected so that the SIN and COS signals output from amplifiers $A_1$ and $A_2$ respectively are as sinusoidal as possible. This arrangement allows a suppression of harmonics up to the ordinal number 6.

Additional harmonics can be suppressed by selecting the length of the sensor elements, measured in the measuring or displacement direction x, based upon the harmonic to be eliminated. For example, to eliminate the third harmonic, the length of the sensor elements measured in the measuring direction x equals ⅓ of the graduation period.

Both methods for suppressing harmonics can be employed separately or in combination with each other.

Figure 6:
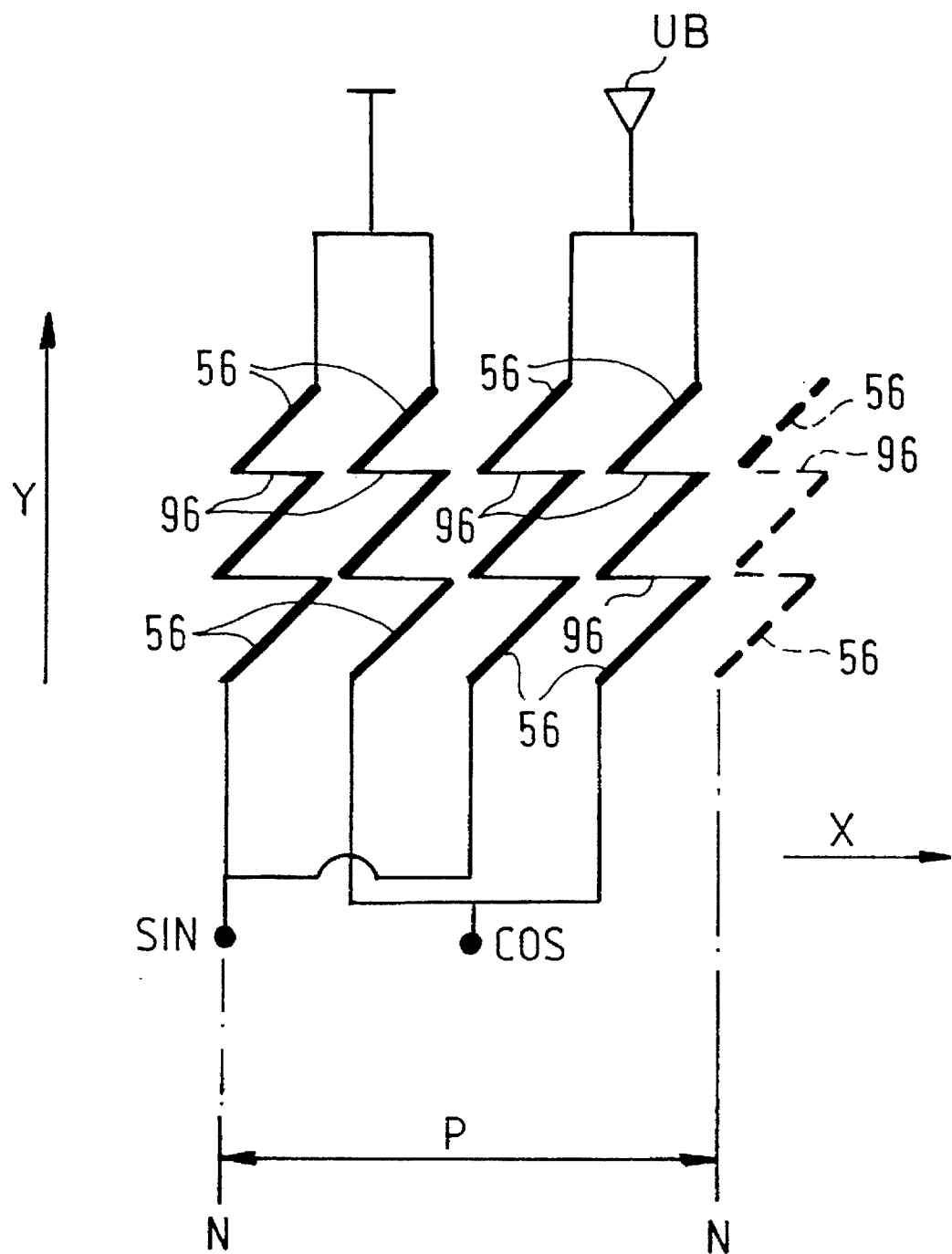
FIG. 6 illustrates a third preferred embodiment for the arrangement of magneto-resistive elements in a staggered pattern.

FIG. 6 illustrates a third preferred embodiment for the arrangement of magneto-resistive elements 56 in a staggered pattern. In particular, a plurality of sections of sensor elements 56 are disposed on a scanning plate (not shown) in a direction transverse to the measuring direction x and the scale (not shown). Conductors 96, which are insensitive to magnetic fields, connect the sensor elements 56 of each section. An advantage associated with this arrangement is an increase in the effective length of the sensor elements 56 which makes it is possible to scan a large area of the scale and generate better signals.

Figure 7:
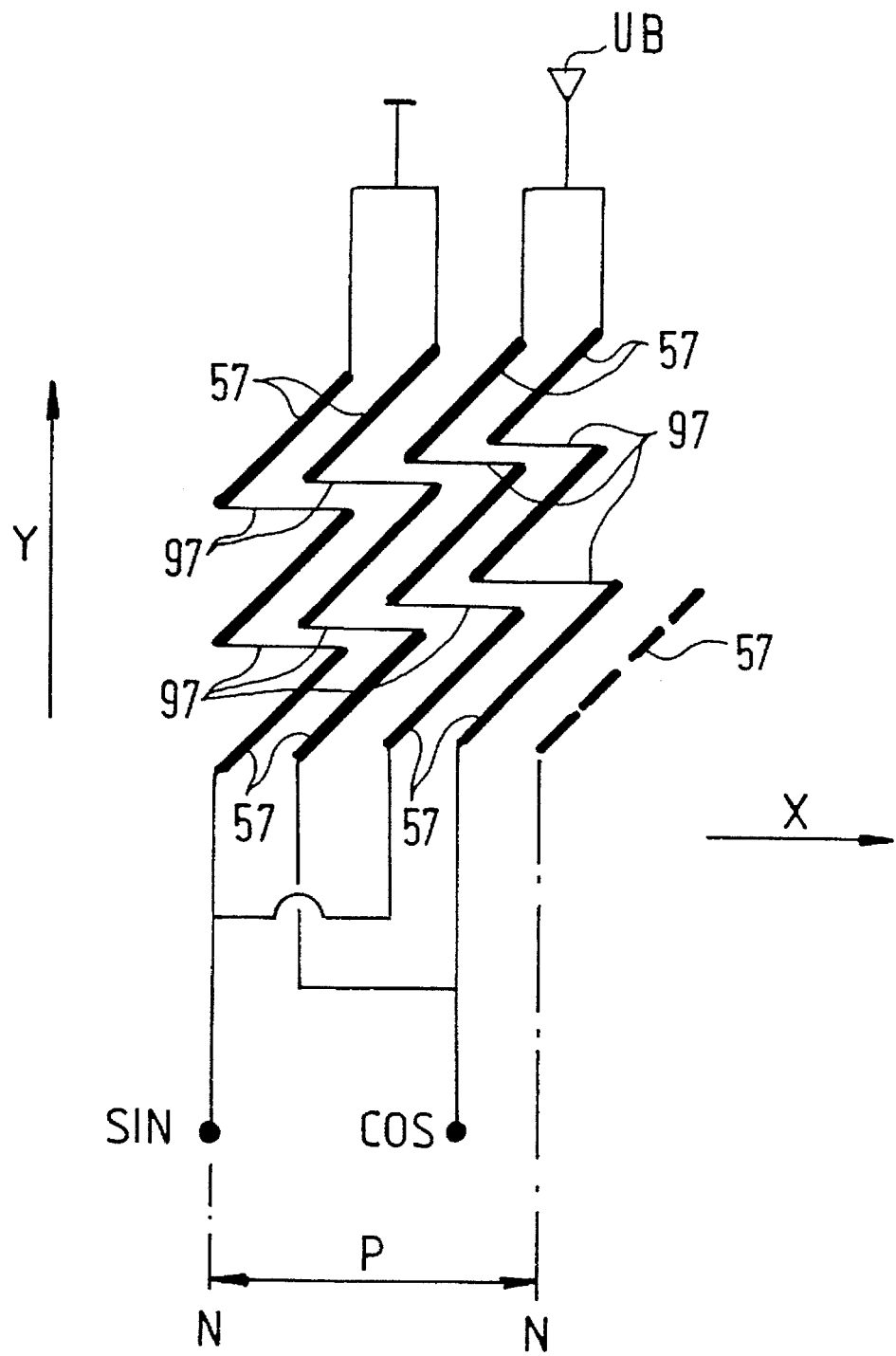
FIG. 7 illustrates a fourth preferred embodiment for the arrangement of magneto-resistive elements similar to the arrangement shown in FIG. 6 but with increased packing density.

FIG. 7 illustrates a fourth preferred embodiment for the arrangement of magneto-resistive elements 57 similar to the arrangement shown in FIG. 6 but with increased packing density. By increasing the packing density of the sensor elements 57, the effective length of each sensor element is increased. This is achieved by displacing adjacent sensor elements 57 transversely with respect to the measuring direction x and scale by a small amount. This transverse displacement of the sensor elements 57 makes it possible to arrange the sensor elements 57 at a distance of ¼ graduation period P with respect to each other along the measuring direction x and still have a greater effective length measured in the measuring direction x than their distance from each other (for example ⅓ graduation period for improved filtering).

Figure 8:
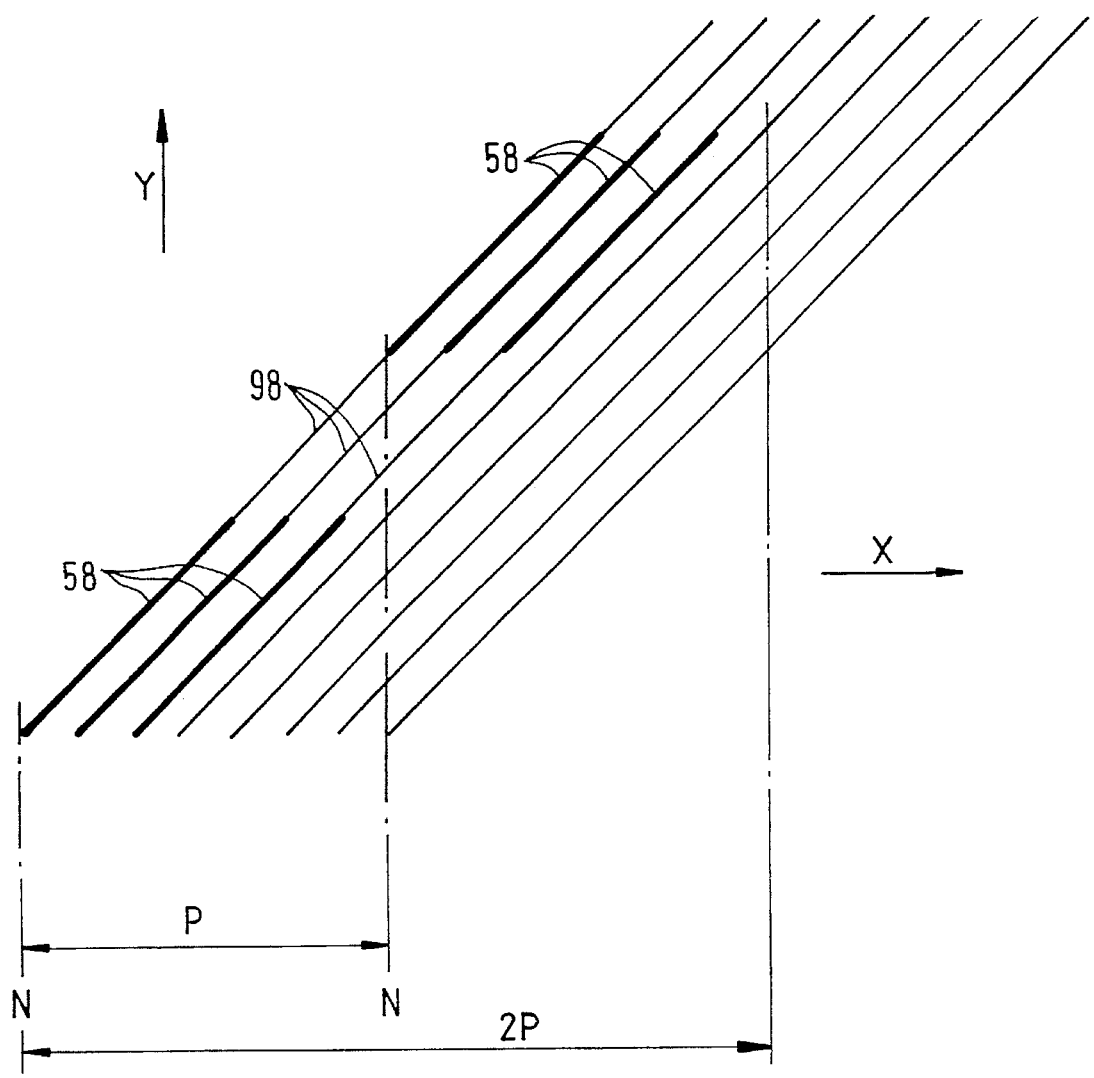
FIG. 8 illustrates a fifth preferred embodiment for the arrangement of a group of magneto-resistive elements extending over several scale periods.

FIG. 8 illustrates a fifth preferred embodiment for the arrangement of a plurality of sensor element 58 extending over several graduation periods. The sensor elements 58 have sensitive zones (drawn in heavy lines) only in sections and are connected by conductors 98 which are insensitive to magnetic fields.

Figure 9:
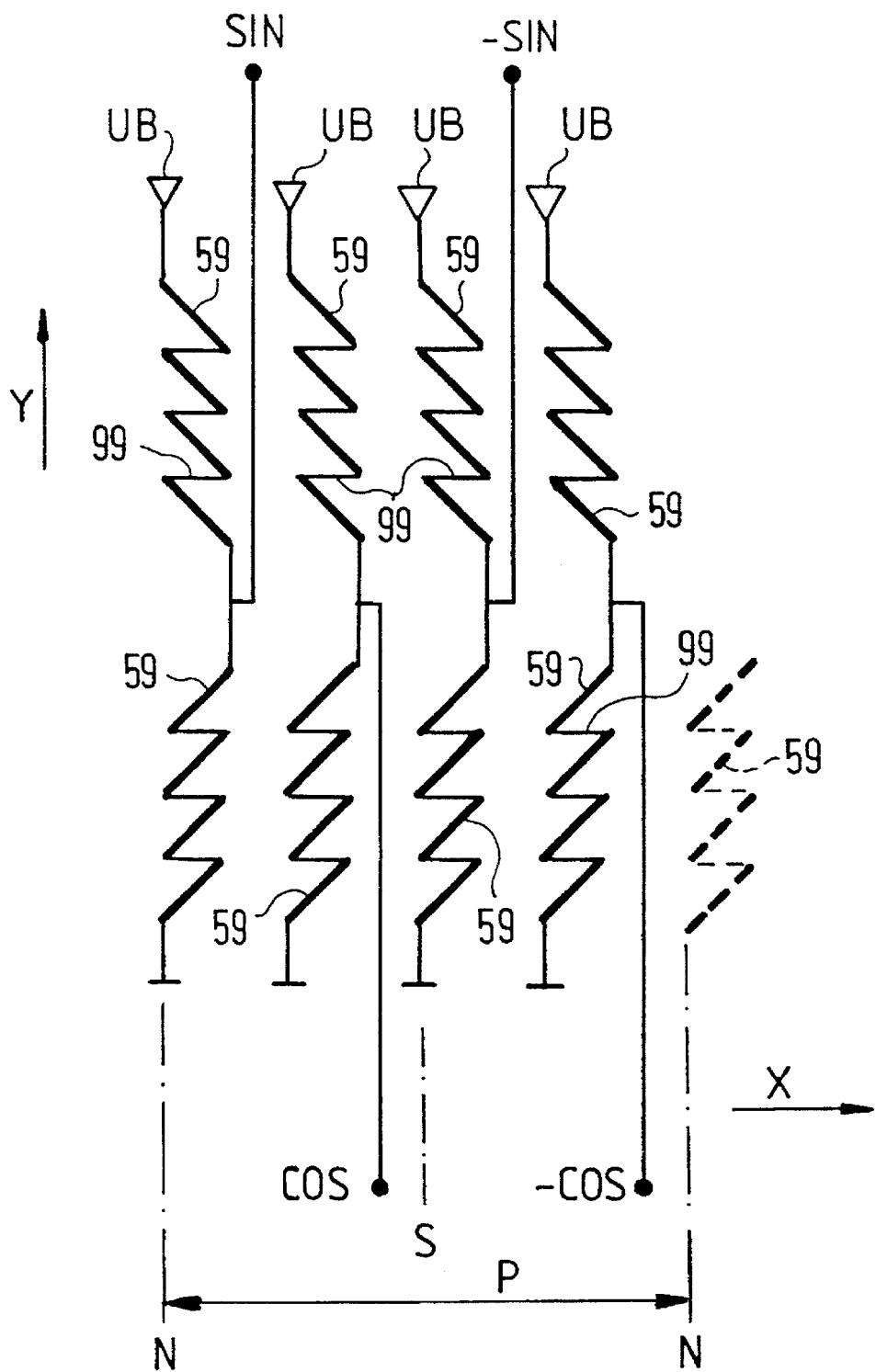
FIG. 9 illustrates a sixth preferred embodiment for the arrangement of a group of magneto-resistive elements combined into a full bridge circuit.

FIG. 9 illustrates a sixth preferred embodiment for the arrangement of a group of magneto-resistive elements combined into a full bridge circuit. Eight sensor elements 59 are illustrated, four of which can be connected together to form a full bridge. As illustrated, the sensor elements 59 which form a half-bridge are respectively turned by 90° in their direction with respect to each other. Because of the linear behavior and the disposition of the sensor elements 59 in such a manner, signals which are displaced by 180° with respect to each other are generated. When connected together in a half-bridge, signals of double amplitude are obtained. An advantage of this arrangement is that it is not necessary to displace the sensor elements 59 forming a half-bridge by ½ graduation period P from each other. Thus, signals SIN, COS and -SIN, -COS are obtained from scale positions which are located close to each other. The sensor elements 59 of a half-bridge are merely disposed crosswise or transversely to the measuring direction x. As in the previous embodiments, only the obliquely positioned portions of the sensor elements 59, shown by heavy lines, are sensitive to the magnetic field and the connecting conductors 99 are insensitive to the magnetic field.

Figure 10:
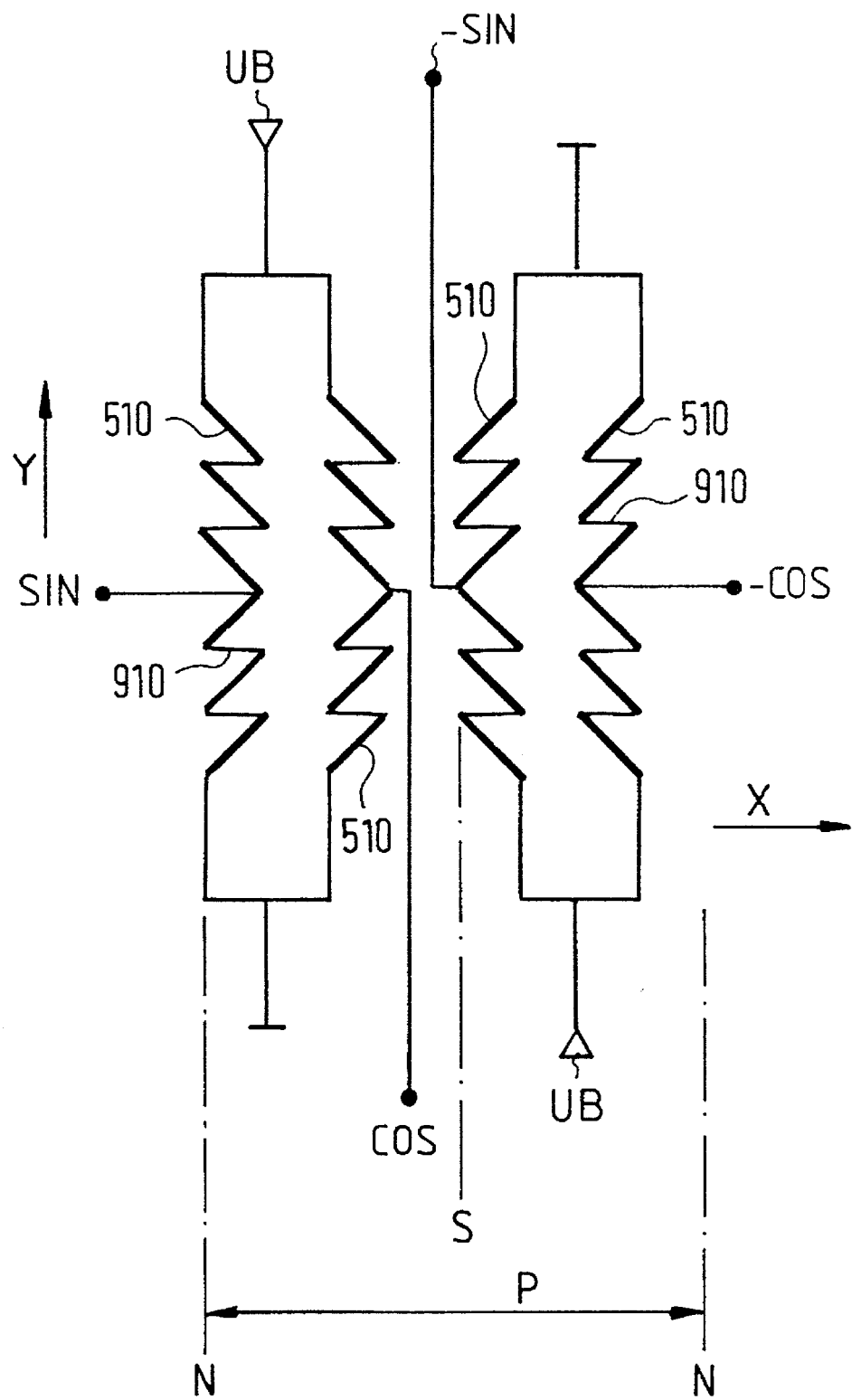
FIG. 10 illustrates a seventh preferred embodiment for the arrangement of a group of magneto-resistive elements combined into a bridge circuit similar to the one shown in FIG. 9.

FIG. 10 illustrates a seventh-preferred embodiment for the arrangement of a group of magneto-resistive elements combined into a bridge circuit similar to the one shown in FIG. 9. The arrangement includes four half-bridges, the sensor elements 510 of which are respectively displaced by ¼ graduation period P from each other. The respective direction of the first set of sensor elements 510 forming two half-bridges are turned by 90° from the second set of sensor elements forming the other two half-bridges. The bridge circuit generates sinusoidal signals with the second harmonics filtered out.

Figure 11:
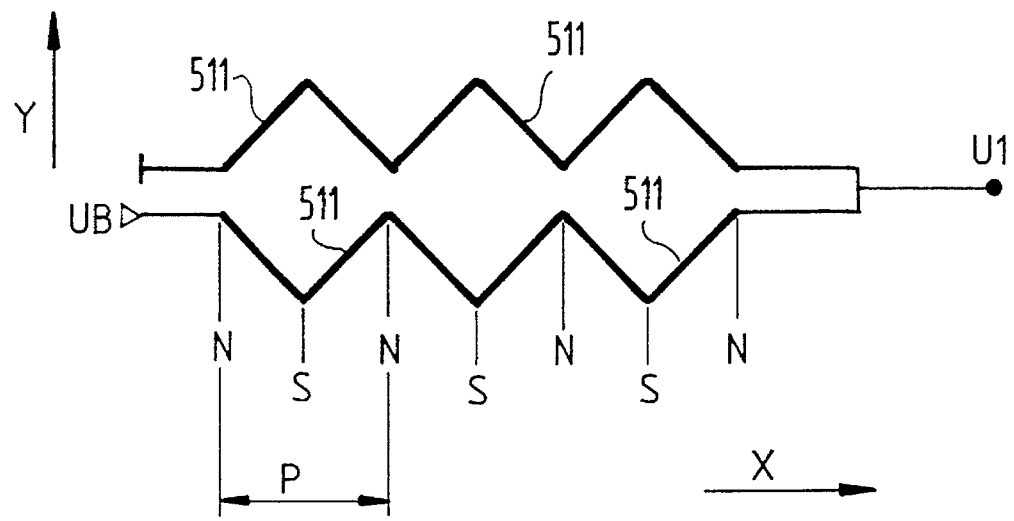
FIG. 11 illustrates an eighth preferred embodiment for the arrangement of a half-bridge circuit in which several sensor elements are connected in a series of quarter-bridges.

FIG. 11 illustrates an eighth preferred embodiment for the arrangement of a half-bridge circuit in which several sensor elements 511 are connected in a series of quarter-bridges. The sensor elements 511 of a quarter-bridge extend over several graduation periods P and the length of each individual sensor element 511 corresponds to half a graduation period P. A sine-shaped voltage U1 is generated at the output of the half-bridge.

Figure 12:
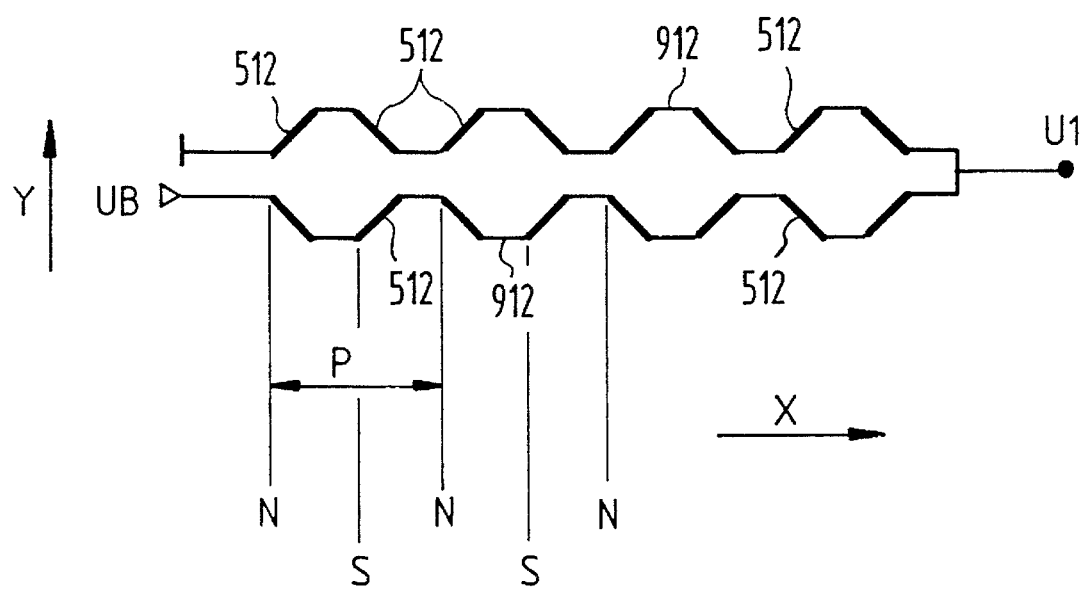
FIG. 12 illustrates a ninth preferred embodiment for the arrangement of a half-bridge circuit similar to FIG. 11 for suppressing harmonics.

As previously described in connection with the measuring arrangement shown in FIG. 5, it is also possible to eliminate further harmonics if the length of the sensor elements is tuned to the length of a specific harmonic of the graduation period (for example, ⅓ for filtering the third harmonic). FIG. 12 illustrates a ninth preferred embodiment for the arrangement of a half-bridge circuit similar to FIG. 11 for suppressing harmonics. Here, the sensitive areas of the sensor elements 512 shown in heavy line are connected with each other by conductors 912 which are insensitive to magnetic fields. The length of the sensitive area of each sensor element 512 is determined by which particular harmonic is to be eliminated.

Figure 13:
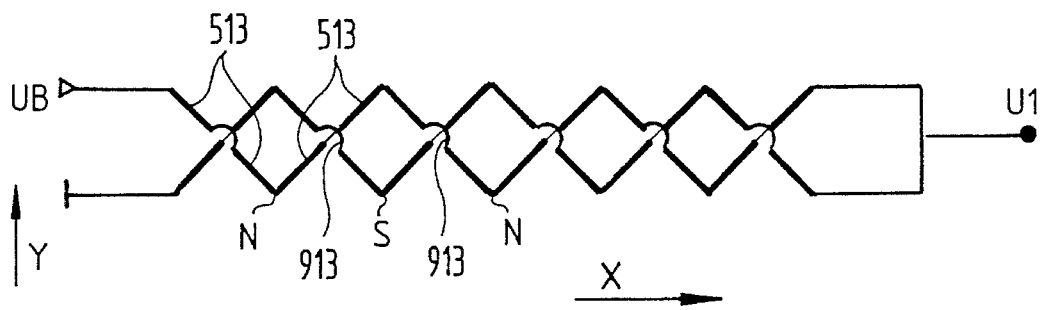
FIG. 13 illustrates a tenth preferred embodiment for the arrangement of a half-bridge circuits similar to the one shown in FIG. 16 in which the sensor elements are interlocked.

FIG. 13 illustrates a tenth preferred embodiment for the arrangement of a half-bridge circuit similar to the one shown in FIG. 11 in which the sensor elements 513 of the quarter-bridges are interlocked. This has the advantage that the signal is obtained from closely adjoining locations on the scale. The associated sensor elements 513 are interrupted at the respective crossing points and connected with conductors strips 913 which are insensitive to magnetic fields. Preferably the crossing conductor strips are located in different planes and are separated by an insulating layer, not shown.

Figure 14:
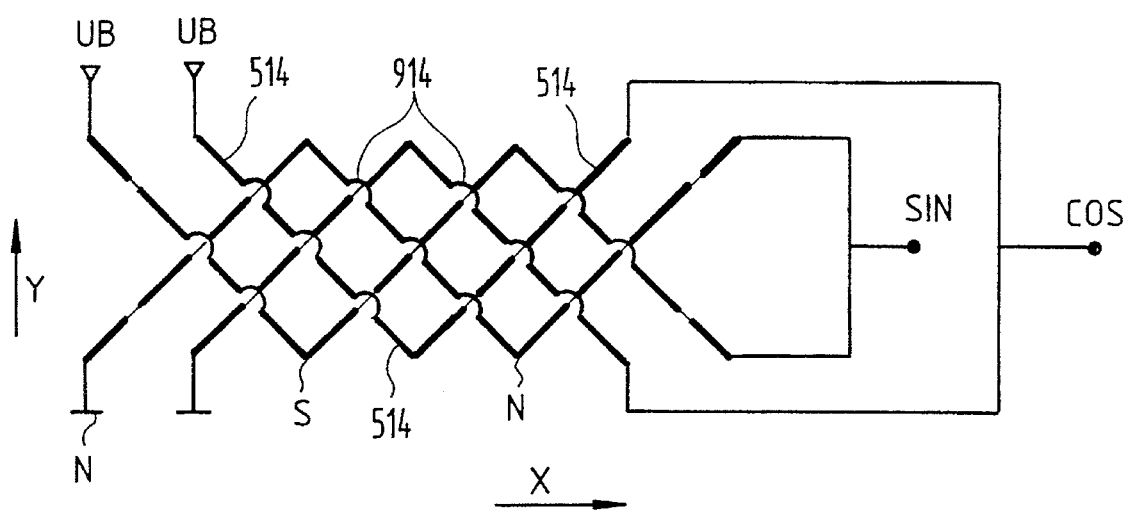
FIG. 14 illustrates an eleventh preferred embodiment for an arrangement with two half-bridges having interlocked elements displaced by a quarter of a scale period with respect to each other.

FIG. 14 illustrates an eleventh preferred embodiment for an arrangement with two half-bridges having interlocked elements displaced by a quarter of a scale period with respect to each other. Two output signals SIN and COS are generated with such an arrangement.

Figure 15:
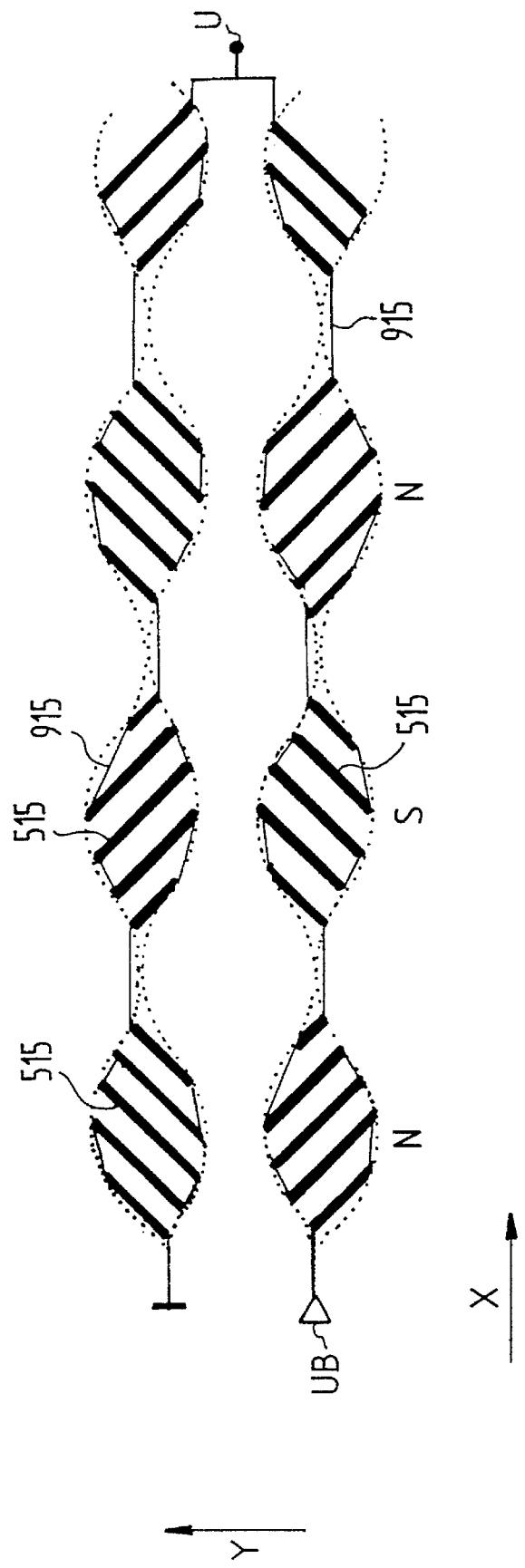
FIG. 15 illustrates a twelfth preferred embodiment for the arrangement of magneto-resistive elements to filter harmonics from the signals.

FIG. 15 illustrates a twelfth preferred embodiment for the arrangement of magneto-resistive elements to filter harmonics from the output signals. This is achieved by stepping the length of the sensor elements 515, corresponding to their displacement in the measuring direction x, in accordance with a cosine function.

Signal filtering can also be achieved by varying the inclination of the sensor elements with respect to the measuring direction since the sensitivity of the sensor elements is determined as a function of the location of the sensor element.

Sensitivity can also be varied by a location-dependent difference in the width of the sensor elements.

Within the scope of the invention it is possible to form combinations consisting of parallel and series connection of the sensor elements within a quarter-bridge. In the same way it is possible to form combinations of parallel and series connection of half-bridges and full bridges.

As already mentioned, the auxiliary field can be selectively generated by means of a permanent magnet or a coil. When using a coil it is additionally possible to generate an output signal having a carrier frequency by supplying the coil with high-frequency current.

The auxiliary field can also be generated by impressing a permanent magnetization crosswise to the measuring direction on the scale.

While this invention has been shown and described in connection with the preferred embodiments, it is apparent that certain changes and modifications, in addition to those mentioned above, may be made from the basic features of the present invention. Accordingly, it is the intention of the Applicant to protect all variations and modifications within the true spirit and valid scope of the present invention.

What is claimed is:

1. A position measuring device for measuring the relative position of two objects which are movable with respect to each other wherein a periodic graduation formed by magnetizing a pattern on a scale is scanned in the measuring direction by a scanning unit, comprising:

at least two magneto-resistive elements for generating position dependent output signals from which position measurement values can be determined in an evaluation device, the magneto-resistive element disposed in the scanning unit in a plane parallel to the periodic graduation and at an angle $\beta$ which ranges from about 0° to about 90° with respect to the measuring direction; and said at least two magneto-resistive elements disposed in the scanning unit in a plane parallel to the graduation wherein the magneto-resistive elements are separated from each other by a fraction of a graduation period along the measuring direction, the plurality of magneto-resistive elements being interconnected to form an electrical bridge;

wherein each of the at least two magneto-resistive elements have a length measured in the measuring direction which is a fraction of the graduation period, wherein the fraction is determined by the reciprocal value of a harmonic to be eliminated;

means for generating an auxiliary magnetic field to magnetically bias the at least two magneto-resistive elements, said auxiliary magnetic field directed perpendicular with respect to a stray field generated by the magnetization of the scale.

2. A position measuring device according to claim 1 wherein the means for generating the auxiliary magnetic field comprises a permanent magnet and the auxiliary magnetic field acts substantially perpendicularly to a component of the stray field generated by the magnetization of the scale in a plane parallel to the graduation plane.

3. A position measuring device according to claim 1 wherein the means for generating the auxiliary magnetic field comprises an electro-magnetic generator and the auxiliary magnetic field acts substantially perpendicularly to a component of the stray field generated by the magnetization of the scale in a plane parallel to the graduation plane.

4. A position measuring device according to claim 1 wherein the position dependent output signals generated by said at least two magneto-resistive elements are sinusoidal and free from harmonics up to a preselected wave number.

5. A position measuring device according to claim 1 wherein the electrical bridge is selected from the group consisting of quarter-bridge, half-bridge and full-bridge.

6. A position measuring device according to claim 1 wherein the length of each of the at least two magneto-resistive elements are stepped, corresponding to their displacement in the measuring direction in accordance with the COSINE function.

7. A position measuring device according to claim 6 wherein the length of each of the at least two magneto-resistive elements within a partial bridge are stepped in accordance with the COSINE function.

8. A position measuring device according to claim 1 wherein the at least two magneto-resistive elements are disposed within a graduation period.

9. A position measuring device according to claim 1 wherein the at least two magneto-resistive elements are displaced transversely to the measuring direction with respect to each other to increase the packing density.

10. The position measuring device of claim 1, wherein said means for generating an auxiliary magnetic field magnetically biases said at least two magneto-resistive elements at an angle $\gamma$.

11. The position measuring device of claim 1, wherein the at least two magneto-resistive elements each lie obliquely with respect to said stray field generated by the magnetization of the scale.

12. A position measuring device according to claim 1 wherein the two or more magneto-resistive elements are disposed within the graduation period.

13. A position measuring device for measuring the relative position of two objects which are movable with respect to each other in a measuring direction comprising:

a scale having a periodic graduation formed by a plurality of magnetized strips of alternating field strength, the scale having a stray field generated by the magnetization of the scale;

a scanning unit comprising:
at least two magneto-resistive elements facing the periodic graduation and parallel thereto, the magneto-resistive element disposed at an angle $\beta$ which ranges from about 0° to about 90° with respect to the measuring direction;

said at least two magneto-resistive elements disposed in the scanning unit in a plane parallel to the graduation wherein the magneto-resistive elements are separated from each other by a fraction of a graduation period along the measuring direction, the plurality of magneto-resistive elements being interconnected to form an electrical bridge circuit;

wherein each of the at least two magneto-resistive elements have a length measured in the measuring direction which is a fraction of the graduation period, wherein the fraction is determined by the reciprocal value of a harmonic to be eliminated;

means for generating an auxiliary magnetic field, the direction of the auxiliary magnetic field.

14. A position measuring device according to claim 13 wherein the means for generating the auxiliary magnetic field comprises a permanent magnet which generates the auxiliary magnetic field in a direction perpendicular to the stray field generated by the scale in a plane parallel to the graduation plane.

15. A position measuring device according to claim 13 wherein the means for generating the auxiliary magnetic field comprises an electro-magnet which generates the auxiliary magnetic field in a direction perpendicular to the stray field generated by the scale in a plane parallel to the graduation plane.

16. A position measuring device according to claim 13 wherein the at least two magneto-resistive elements are connected to generate sinusoidal signals free of harmonics.

17. A position measuring device according to claim 13 wherein the electrical bridge circuit comprises a quarter-wave bridge circuit.

18. A position measuring device according to claim 13 wherein the electrical bridge circuit comprises a half-wave bridge circuit.

19. A position measuring device according to claim 13 wherein the electrical bridge circuit comprises a full-wave bridge circuit.

20. The position measuring device of claim 13, wherein said auxiliary magnetic field forms an angle $\gamma$ with respect to said at least two magneto-resistive elements.

21. A position measuring device according to claim 12 wherein the two or more magneto-resistive elements are displaced transversely to the measuring direction with respect to each other.

22. A method of measuring the relative position of two objects which are movable with respect to each other comprising the steps of:

providing a scale on a first object, the scale having a periodic graduation formed by a magnetized pattern on the scale;

providing a scanning unit on a second object, the scanning unit having at least two magneto-resistive elements for scanning the periodic graduation of the scale, the at least two magneto-resistive elements disposed in a plane parallel to the plane of the scale and at an angle $\beta$ ranging from about 0° to about 90° with respect to the measuring direction;

disposing said at least two magneto-resistive elements in a plane parallel to the graduation wherein the magneto-resistive elements are separated from each other by a fraction of a graduation period along the measuring direction;

interconnecting said two or more magneto-resistive elements to form an electrical bridge;

choosing the length of each of the at least two magneto-resistive elements have a length measured in the measuring direction which is a fraction of the graduation period, wherein the fraction is determined by the reciprocal value of a harmonic to be eliminated;

generating an auxiliary magnetic field for magnetically as the scanning unit scans the periodic graduation of the scale;

generating a stray field from the magnetization of the scale, wherein said auxiliary magnetic field is directed perpendicular to said stray field; and generating at least one position dependent output signal.

23. A position measuring device for measuring the relative position of two objects which are movable with respect to each other wherein a periodic graduation formed by magnetizing a pattern on a scale located on one of the two objects is scanned in a measuring direction by a scanning unit located on the other of the two objects, comprising:

at least two magneto-resistive elements for generating position dependent output signals from which position measurement values can be determined in an evaluation device, the magneto-resistive element disposed in the scanning unit in a plane parallel to the periodic graduation and at an angle $\beta$ which ranges from about 0° to about 90° with respect to the measuring direction; and wherein the at least two magneto-resistive elements are separated from each other by a fraction of a graduation period along the measuring direction and are interconnected into electrical bridges; and wherein the length of each of the at least two magneto-resistive elements is graduated in correspondence to a displacement in the measuring direction according to a COS function so that the two or more magnetoresistive elements function to filter harmonics.

24. A position measuring device according to claim 23 further comprising a means for generating an auxiliary magnetic field.

25. A position measuring device according to claim 23 wherein the position dependent output signals generated by the two or more magneto-resistive elements are sinusoidal and free from harmonics up to a preselected wave number.

26. A position measuring device according to claim 23 wherein the electrical bridge is selected from the group consisting of quarter-bridge, half-bridge and full-bridge.

\* \* \* \* \*